Jan. 12, 1971 G. A. STEINDORF 3,554,836
TRANSFER PROCESS
Filed July 19, 1968 2 Sheets-Sheet 1
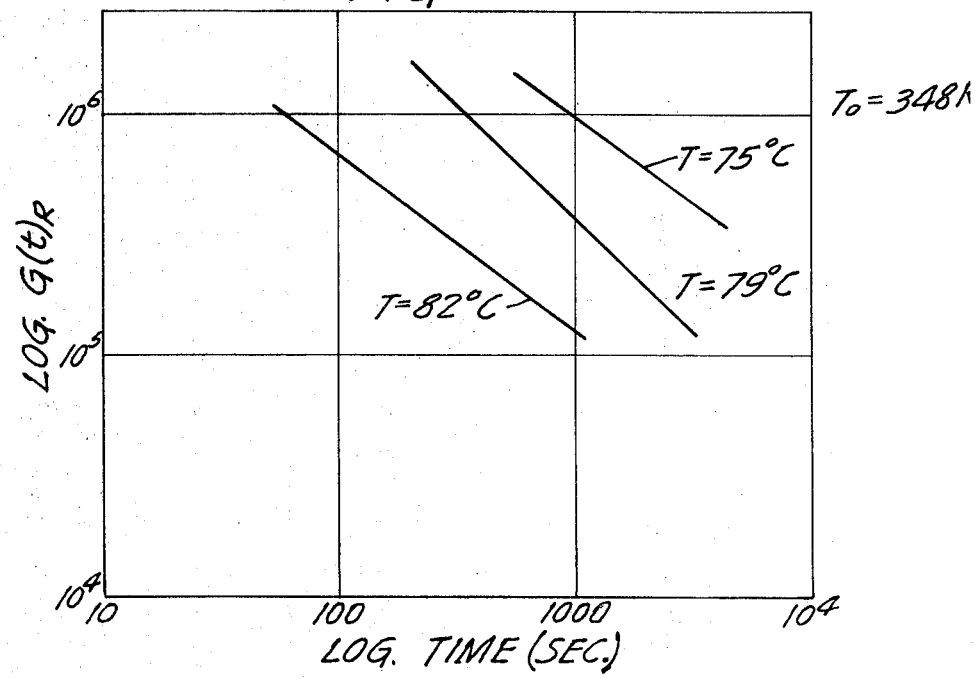
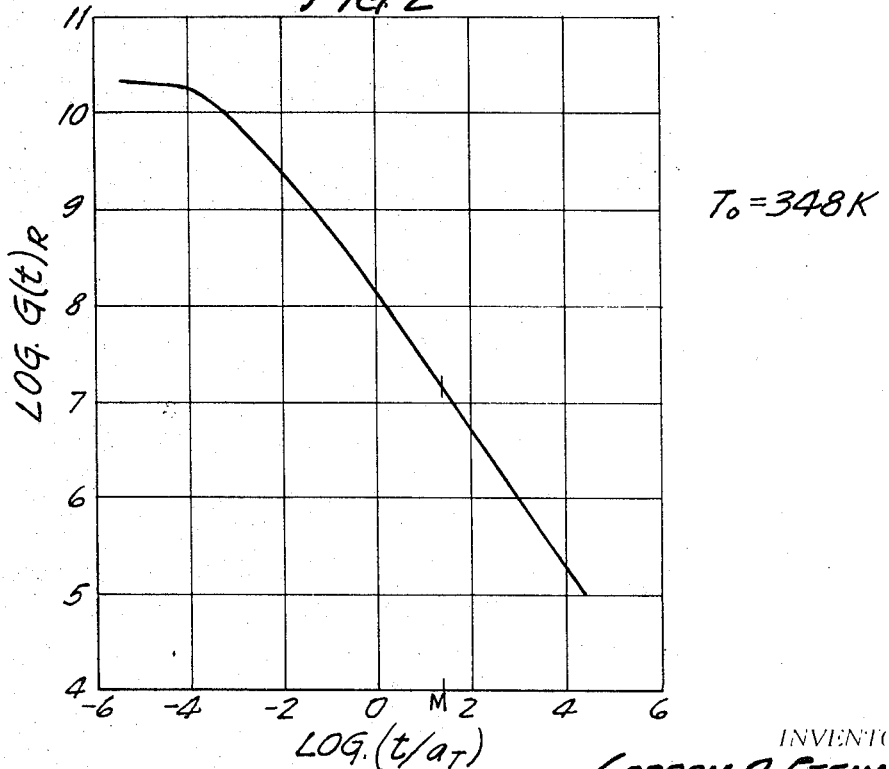
INVENTOR.
GORDON A. STEINDORF
BY Kinney, Alexander,
Sell, Steldt & DeLaHunt
ATTORNEYS Jan. 12, 1971  G. A. STEINDORF  3,554,836
TRANSFER PROCESS
Filed July 19, 1968  2 Sheets-Sheet 2
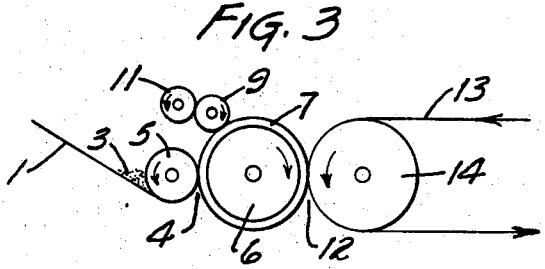
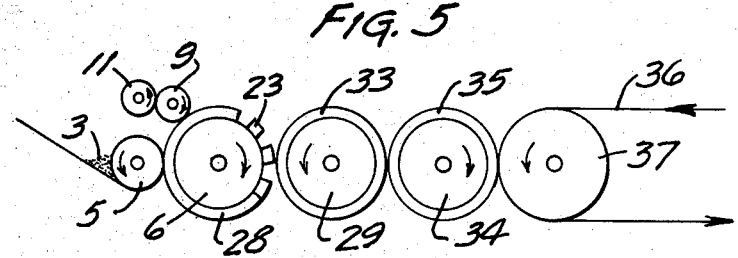
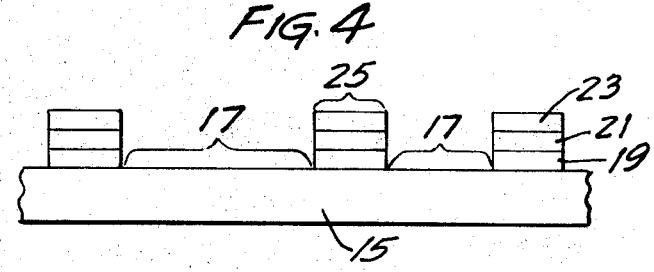
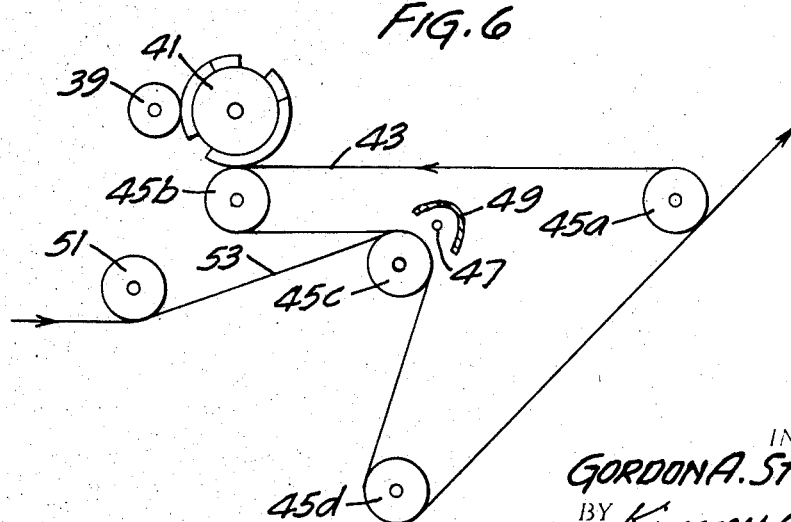
INVENTOR.
GORDON A. STEINDORF
BY Kinney, Alexander,
Sell, Steldt & DeLaHunt
ATTORNEYS

United States Patent Office 3,554,836
Patented Jan. 12, 1971

3,554,836
TRANSFER PROCESS
Gordon A. Steindorf, Oakdale Township, Washington County, Minn., assignor to Minnesota Mining and Manufacturing Company, St. Paul, Minn., a corporation of Delaware
Filed July 19, 1968, Ser. No. 746,195
Int. Cl. B44c 1/24
U.S. Cl. 156—240                13 Claims

ABSTRACT OF THE DISCLOSURE

A process for the controlled reception and transmission of thermoplastic transfer medium via one or more silicone elastomer surfaces to final deposition on a receptor surface which may be another silicone elastomer surface or, more generally, paper, a polymeric film, metal, glass, clay, etc. The process utilizes forces intrinsic to the materials employed, i.e., silicone elastomers, thermoplastic transfer medium (ink) and the various receptor surfaces. The physical state of the transfer medium can be manipulated to provide for non-splitting transfer from one silicone elastomer surface to another, adhesively favored silicone elastomer or nonsilicone elastomer surface. The process finds utility in the coating, printing, and duplicating field.

---

This invention relates to the fields of coating, printing and duplicating; more particularly it relates to the controlled adhesion, transport and transfer of thermoplastic inks in a manner adaptable for use in coating, printing and duplicating operations.

The desirable characteristics for image transfer operations involved in printing and the like are high image fidelity, high speed, suitability to various receptor types, ease of operation, mechanical simplicity, freedom from safety hazards, and use of materials and conditions which minimize clean up problems. The techniques presently in use represent no more than a compromise of these desirable features.

Letter press printing, for example, provides reasonably good image fidelity at high speeds but due to the relatively high pressures exerted during printing, lacks suitability for fragile or irregularly shaped receptor surfaces. Also, the ink employed in letter press printing and offset printing must satisfy complicated rheological properties which necessitates the use of skilled operators and complicated machinery. Moreover, since the ink transfers from surface to surface by film splitting, residual ink must be regularly removed to prevent smudging and blurring.

Silk screen printing is mechanically and procedurally uncomplicated, has versatility in terms of receptor surfaces, but lacks speed and image fidelity. Also, fluid inks are involved which make the technique messy.

Xeroprinting, a fairly recent innovation, does not involve the use of pressure to effect image transfer and thus is suitable for fragile receptor surfaces. Dry inks are employed which eliminate much of the cleaning problems attendant with the use of fluid inks as well as the fire hazards displayed by flammable solvent based inks. Drawbacks to this technique include the need for electrostatically responsive inks, special fixing procedures for bonding the ink to the receptor, and the use of only those receptor surfaces which will not interfere with the electrostatic nature of image transfer.

In the field of duplicating, techniques such as spirit or stencil duplicating, while relatively inexpensive and uncomplicated, lack receptor surface versatility and image fidelity, as well as being extremely messy. Xerography too has its drawbacks including high cost, complicated machinery, unsuitability to a variety of receptor surfaces, and on occasion, poor image fidelity.

The offset printing technique described in U.S. Pat. No. 3,255,695 as well as in its British counterpart, Great Britain Pat. No. 1,053,625, represents an attempt at alleviating many of the problems attendant with previously known printing processes. The process therein described involves providing an offset roll having a polymerized, preferably elastomeric, surface with a film-forming ink which initially wets the offset pad and is then converted by heating of the offset pad to partially dry condition while concurrently attaining a transitory condition of substantial adhesive tack on the exposed surface of the ink. At the point in time when such conditions exist, the offset roll is contacted by a receptor and total transfer of the ink film is effected. The ink formulations particularly described in the above-mentioned patents are solvent-based, film-forming inks which in conventional offset printing would split at the moment of transfer but which, by a suitable selection of temperature and composition of the offset roll surface, will now transfer substantially completely to the receptor. While the above-mentioned British patent specifically describes only solvent based ink systems, it is stated that the ink may initially be provided in solid or powder form so long as it attains the desired condition of fluency as defined for solvent based systems. Whether they be solvent-based inks or powder inks, however, it is stated to be necessary that in its fluent state the ink selected be, among other things, capable of attaining a transitory transfer state in which the ink wets both the offset pad and the article to be printed.

The process described in the above mentioned patents does not include a softening step for the ink or transfer medium, nor does such process require that the ink be thermoplastic. By contrast, the process of this invention necessarily requires a softening step at some point in the process and the transfer medium is required to be thermoplastic in character. Moreover, whereas the process described in said patents does not result in a fusion type of bond between the ink and the printed surface, the process of this invention generally, and certainly preferably, does provide a fusion type of bond between transfer medium and printed surface.

While the offset printing process described in the above-identified U.S. patent assertedly overcomes many of the disadvantages of conventional printing processes, it depends on the presence of a controlled quantity of liquid carrier or solvent in the ink or transfer medium to effect transfer. Imbalance can disrupt the transfer process. The process of the present invention does not depend upon maintenance of such transitory conditions.

It is therefore an object of this invention to provide an image transfer process which exhibits the above-mentioned desirable characteristics recognized but hitherto unobtainable in one system.

It is a further object to provide a process for the delineation and transfer of an image to a receptor surface which does not depend upon the achievement of a delicately balanced time-dependent set of conditions.

Another object is a process which will provide development of a fusion type bond between the transfer medium and the final receptor surface without the need for a separate fixing step.

Still another object is a process in which the transfer medium can be fixed to the desired receptor surface with minimal power requirements to provide relatively high speed printing or duplicating.

These and other objects which will become more apparent hereinafter are provided by a process which in general comprises applying non-solvent based thermoplastic transfer medium to a silicone elastomer surface, the transfer medium assuming a fixed pattern on such silicone elastomer surface, optionally offsetting the transfer medium in such pattern one or more times to successively adhesively favored silicone elastomer surfaces, and finally transferring the transfer medium without splitting to a final receptor surface.

The acceptance and transfer of thermoplastic transfer medium is accomplished according to this invention by the utilization of forces and properties inherent in the material involved in the process, i.e., silicone elastomers, thermoplastic transfer medium, and the various receptor surfaces to which the transfer medium is transferred. By eliminating substantial pressure as the means for transfer, mechanically lighter structures may be employed, deformation of the image is avoided, and versatility in final receptor surfaces is gained. Although electrostatic forces may be employed in conjunction with the process of this invention, particularly as a direct or indirect means for delineating a transfer medium defined image on a silicone elastomer surface, the process is not necessarily dependent on electrostatic forces. Consequently, greater flexibility in choice of transfer mediums and uniformity in image coverage may be achieved by the process of this invention. Moreover, the forces and properties upon which the process of this invention relies are reversible in character, in contrast, for example, to the process described in U.S. Pat. No. 3,255,695 wherein the transition through the transfer state is transitory and irreversible.

For purposes of discussion herein, the silicone elastomer surfaces employed in the process of this invention may be considereded as relatively low surface energy pressure sensitive adhesives. The thermoplastic transfer medium, whether it be in a solid, glassy state, a liquid state, or an intermediate state, acts as an adherend relative to such silicone elastomer surfaces. In the case of non-elastomeric receptor surfaces such as paper, metals, clays, etc., the functions are reversed, i.e., the receptor surface becomes the adherend and the transfer medium becomes the adhesive material at least when in a rubbery or compliant state. In their function as pressure sensitive adhesives, the silicone elastomer surfaces wet the transfer medium and thereby adhesively bond same to the surface. This adhesive bond is, however, quite weak, much weaker, for example, than the bond which would be developed from conventional, room temperature pressure sensitive adhesives such as are employed as a coating for pressure sensitive tapes.

It is often desirable as hereinafter discussed to transfer or offset the transfer medium to one or a series of silicone elastomer surfaces before deposition on the final receptor surface which may or may not be a silicone elastomer surface. Each successive transfer will involve a donor and receptor surface, each receptor being in turn a donor for the transfer medium until the transfer medium is deposited on the final receptor surface which will ultimately bear the transfer medium. Transfer of the thermoplastic transfer medium from one silicone elastomer surface to another is effected by employing as the receptor surface a silicone elastomer which is a more effective pressure sensitive adhesive than the donor surface.

The requisite differential in pressure sensitive adhesiveness may be provided in a number of ways, including the use of a "softer" or less "hard" receptor surface than the donor surface or a more tacky receptor surface or a combination of the two. In the former case, the adhesive differential may be imposed by using a second silicone elastomer surface which has an effective durometer hardness less than the effective durometer hardness of the first silicone elastomer surface. The phrase "effective durometer harness" is employed since the measured hardness of the silicone elastomer layer may depend on the backing for such surface. For example, it is convenient and sometimes preferred to coat the silicone elastomeer onto a backing of relatively hard material such as a metal, preferably but not necessarily in the form of a roll or cylinder. The backing influences the hardness which the coating of silicone elastomer exhibits to the transfer medium.

With the same backing and the same elastomer composition, transfer from one to the other can be effected by employing a thinner coating of elastomer on the donor surface than the receptor surface thereby enhancing the influence of the hard backing material on the donor surface.

One could employ other means as well for creating the requisite hardness differential, an exemplary one being the use of an intermediate layer between the exterior silicone elastomer surface and the metal roll, the intermediate layer being so chosen that it will impart to the silicone elastomer surface with which it is in contact an effective durometer hardness different from that exhibited by the other equally thick silicone elastomer surface involved in the transfer process. As is thus apparent, many ways exist to impart the desired differential hardness to the silicone elastomer surfaces involved in the transfer process. Variations in hardness can also be obtained by the selection of modifying fillers for incorporation into the silicone elastomer matrix. Exemplary fillers include silica, iron oxide and titanium dioxide.

The differential adhesive force between the donor and receptor silicone elastomer surfaces sufficient to provide transfer of the thermoplastic transfer medium from the first to the second may also be provided by selecting silicone elastomers which have different tack stresses (in grams/cm.$^2$ at a specified temperature), the tack stress of the receptor being greater than the donor. Tack stress is temperature dependent and in the case of silicone elastomers it has been found that the relative order of tack stress magnitudes for a series of such elastomers remains the same through a broad temperature range.

The tack can be measured in terms of the force which is necessary to separate two materials (specifically, the silicone elastomer and a probe of stainless steel) at the interface without suffering cohesive failure in one of the components. The tackiness displayed by a material depends on the temperature, rate of the probe separation from the sample, the probe-sample contact time, probe pressure, and the intrinsic physical and chemical properties of the probe and the sample.

The tack force values at 23° C. are determined by contacting the sample with a polished stainless steel surface for a fixed time period and then measuring the force which is needed to achieve the probe-sample separation. The contact time is 2.0 sec., the probe removal rate .5 cm./sec. The pressure exerted by the probe is 133 grams/cm.$^2$. The tack is expressed as "tack stress" in terms of force per unit area (grams/cm.$^2$). The relative humidity during testing is about 45%.

TABLE I

| Elastomer trade name | Manufacturer | Tack, gm./cm.$^2$ |
|---|---|---|
| K-1044R | Union Carbide | 1,500 |
| K-1314 | do | 1,280 |
| RTV 630 | General Electric | 1,220 |
| KW-1300 | Union Carbide | 1,110 |
| RTV 631A | General Electric | 890 |
| PlastiSIL PL831 | do | 810 |
| Silastic 780 RTV | Dow Corning | 580 |
| Sylgard 186 | do | 560 |
| RTV 118 | General Electric | 440 |
| Sylgard 182 | Dow Corning | 390 |
| Silastic Type A RTV | do | 390 |
| PlastiSIL PL815 | General Electric | 360 |
| PlastiSIL PL830 | do | 220 |
| RTV 20 | do | 220 |
| RTV 21 | do | 220 |
| Silastic 583 RTV | Dow Corning | 190 |
| Silastic 950-38 | do | 190 |
| Silastic 589 RTV | do | 170 |
| RTV 60 | General Electric | 110 |
| RTV 30 | do | 80 |
| RTV 11 | do | 80 |

From the tack stress data of Table I it is possible to select silicone elastomers for the donor and receptor surfaces, the criteria being the selection of a silicone elastomer for the receptor surface which has a higher tack stress than the silicone elastomer for the donor surface. One couplet might be, for example, for the donor surface, "Silastic 583 RTV" and for the receptor "RTV 631A."

A third approach to providing the requisite adhesive force differential is to modify the surface characteristics of the elastomers by, for example, exposing the surface to glow discharge for a relatively short period of time, on the order of 60 seconds or so. As a consequence of this treatment, the adhesion of the transfer medium on the treated silicone elastomer surface is increased.

The silicone elastomers required in the ractice of this invention are formed from the cure or further polymerization of "silicone gums." The polymers listed in Table I above represent a few of the commercially available filled silicone gum compositions having as a primary constituent a polysiloxane which upon curing under appropriate humidity conditions, forms a silicone elastomer.

In contradistinction to the process described in U.S. Pat. No. 3,255,685 and British Pat. No. 1,053,625, the silicone elastomer surfaces employed in this invention will not accept the solvent based inks described in said patents due to their highly adhesive character. The adhesive nature of the silicone elastomer surfaces can be quantitatively described in terms of release value. Release values are determined on an "Instron," Model TM operating at a crosshead speed of 12 inches per minute and chart speed of 2 inches per minute. One-inch Johnson & Johnson "Red Cross" brand waterproof adhesive tape is used, selecting only a roll having a retention force of about 450 grams (425–475) as measured at 80° F. on a 24-gauge, No. 4 finish stainless steel test panel. In determining either the retention force of the tape to be used or the release value of a sample, a ten-inch strip of tape is applied to a 6-inch by 1½ inch panel by passing 4½ pound rubber-faced tape roller twice over the tape, using only the weight of the roller. The sample is immediately placed in the Instron and the force in grams necessary to strip the tape at an angle of 180° is determined. The amount of force required to strip the tape is referred to as the "release value," and the larger the release value, the more adhesion there has been between the adhesive tape and the surface. A small release value indicates a very effective release coating and a large release value indicates a very ineffective release coating. Standard tests for release value are described in TAPPI (Technical Association for the Pulp and Paper Industry), vol. 43, No. 8, pp. 164A and 165A (August 1960) and TAPPI Routine Control Method "RC–283 Quality of Release Coatings," issued 1960. Many silicone elastomer surfaces have been found to have a release value of only 1 gm./in., and none greater than 30 gm./in. Such materials have been found satisfactory in the process of this invention. Materials which have a release value greater than 100 g./inch will accept transfer medium but will not release it in non-splitting fashion to the receptor.

Depending on the curing mechanism to be used, specific silicone gums are prepared, all having the central, repeating linear unit:

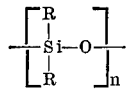

where $n$ may be as small as 2 or as large as 20,000 or more, and where all R's in the chain may be the same, but need not be, each individual R being monovalent alkyl or aryl group, halogenated alkyl or aryl group or cyano alkyl group, with not more than a few percent of total R being vinyl, phenyl or halogenated vinyl or phenyl, the major proportion of R usually being methyl groups. While an internal R may become a crosslinking site, depending somewhat on the curing mechanism, crosslinking or chain extension more frequently involves the end groups which may be:

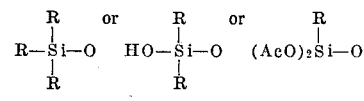

where "R" has the same meaning as above, and where Ac is a saturated aliphatic monoacyl radical.

Silicone elastomers, formed by further polymerizing the gums just referred to, can be characterized generally as very sparsely crosslinked (cured) dimethyl polysiloxanes of high molecular weight, e.g., 400,000–800,000 average molecular weight. The sparsity of crosslinking is indicated by R/Si ratios very close to 2, generally above 1.95, or even above 1.99, and generally below 2.1 or even below 2.01, there usually being 200–500 dimethyl units between crosslink sites. In contrast, the much more densely crosslinked silicone resins which are considered commercially useful fall in the range of R/Si ratios of 1.2–1.5.

The polymerizable silicone gums preferably are compounded with a catalyst to promote curing, as generally known to those in the art. Exemplary catalysts are dibutyl tin dilaurate, tin octoate and lead octoate. Moisture curing silicone gums such as the acetoxy terminated silicone gums may also be employed in the practice of this invention. Fillers such as silica, titanium dioxide and iron oxide may also be employed to improve mechanical properties.

Silicone elastomer roller surfaces can be fabricated by a number of techniques, depending on the viscosity of the uncured silicone. The desired roll covering should be smooth and of controlled thickness. A shiny air cured surface is most desirable. Silicone elastomer sleeves for rollers can be made by centrifugally casting in a cylindrical mold or by coating a curable silicone gum on a heat shrinkable tubing such as Teflon and then curing. Blankets and belts can be knife coated or extruded. Spinning rollers can be dip coated from a tank. A preferred method is essentially knife coating a roller surface in such a manner as to obtain a smooth seamless surface. Depending on the silicone and the surface being coated, a primer coat may be required for bonding the silicone elastomer to the support surface.

To attain any degree of transfer of thermoplastic transfer medium from one silicone elastomer surface to another requires that the receptor surface be a superior pressure sensitive adhesive, whether by reason of a lesser durometer hardness, greater tack stress, or combination thereof or some other equivalent means. In the case of non-silicone elastomer receptor surfaces such as paper, clay, ceramic, glass, plastic, and metals, e.g. aluminum or stainless steel etc. which do not exhibit even the weak pressure sensitive adhesive properties of the silicone elastomers, transfer requires that the transfer medium be in a state wherein it, rather than the receptor, displays adhesive characteristics. In general this requires that the transfer medium be in other than a hard glass, particulate state—either a rubbery, compliant state, or a liquid flow state.

Further considerations are brought into play, however, in determining the extent of transfer, i.e., whether the transfer medium will split between donor and receptor surfaces as occurs in conventional offset printing or whether it will transfer substantially completely to the receptor. As a general consideration to obtain substantially complete or non-splitting transfer, it is axiomatic that the cohesive force of the transfer medium must exceed the force of adhesion exerted by the donor surface on the transfer medium. In the case of a monolayer of transfer medium in a dry, glassy, particulate form, the cohesive force referred to is the internal force holding the individual particle together. This force is well beyond the adhesive forces exerted by the transfer surfaces involved in the process and thus splitting does not occur. In the case of a fused layer of transfer medium, which acts as a monolayer, the cohesive force referred to is the force tending to maintain the layer as an integral mass. This force, like that of the cohesive force of a monolayer of particulate transfer medium, is quite high. In the case of a multilayer of dry, glassy particulate transfer medium, the cohesive force referred to is the force exerted by one individual particle on another. This force is generally weaker than the transfer forces exerted by silicone elastomer donor surfaces involved herein and thus splitting of the transfer medium will occur. In the case of transfer medium in other than the dry, glassy state, whether a monolayer or multilayer, the cohesive force referred to is likewise the force tending to maintain the entire transfer medium intact as an integral mass. This cohesive force varies greatly—from a relatively high cohesive strength when the transfer medium is in what is termed the rubbery or compliant state to a relatively low cohesive strength when the transfer medium is in a liquid flow state. By avoiding the dry, glassy state or the liquid flow state and operating within the rubbery or compliant state, hereinafter more specifically defined as the 100% non-splitting transfer state, transfer of a multilayer of transfer medium can be achieved with the transfer surfaces herein described.

The transfer state of thermoplastic transfer medium wherein non-splitting, substantially 100% interfacial transfer is obtained may be defined in terms of viscoelastic properties as the state wherein the transfer medium has a creep modulus (defined as $$G_{(t)} = \frac{1}{J_{(t)}}$$

where $J_{(t)}$ is creep compliance) in the range of between about $10^8$ dynes/cm.$^2$ and about $10^4$ dynes/cm.$^2$. Under process operating conditions, the creep modulus of transfer medium is dependent on two parameters—the temperature of the transfer medium and the time in which two transfer surfaces are in contact with each other with the transfer medium between the contacting surfaces. In the case of transfer surfaces in the form of rolls, contact time is determined by the nip length and surface speed of the rolls. The conditions of temperature and contact time necessary for achievement of this transfer state may be determined for thermoplastic transfer medium according to the following technique.

The first step is to measure a mechanical material function such as modulus or compliance as a function of time $(t)$ at a series of fixed temperatures. The modulus data $G_{(t)}$ are reduced to a reference temperature $T_0$ (generally one of the temperatures at which the original data was taken) by multiplying $G_{(t)}$ by the factor $T_0\rho_0/T\rho$, i.e.

$$G_{(t)\text{Reduced}} = G_{(t)} \cdot \frac{T_0\rho_0}{T\rho}$$

where $\rho$ and $\rho_0$ are densities of the polymer matrix at the measurement temperature T and $T_0$. A series of curves is then generated by plotting the logarithm of $G_{(t)R}$ versus the logarithm of time $(t)$, exemplary curves being shown in FIG. 1 wherein the transfer medium is 40% by weight "Epon–1004" (trade name for an epoxy resin available from Shell Chemical Co.) and 60% by weight magnetite (iron oxide). Preferably, this data should be obtained in the same general temperature range as the process is to be carried out, generally in the range of 50–200° C. The procedure employed is described by Ferry in Viscoelastic Properties of Polymers, John Wiley and Sons (1961), which text is incorporated herein by reference.

The second step in this technique is to shift or translate the $G_{(t)R}$ curves obtained at temperatures other than the reference temperature $T_0$ along the logarithmic time axis of FIG. 1 until the curves superimpose. The direction and extent of shifting of the curve along the time axis is given by the shift factor $a_T$. This shift of the curve representing the data at the temperature T to the curve representing the data at the temperature $T_0$ may be given by the following Arrhenius type relation:

EQUATION I $$\log a_T = \log t_T - \log t_{T_0} = \left(\frac{\Delta H_v}{2.303 R}\right)\left(\frac{1}{T} - \frac{1}{T_0}\right)$$

wherein $t_T$ and $t_{T_0}$ are, respectively, measurement times at absolute temperature T and $T_0$ that display equivalent values of reduced modulus, R is the gas constant (1.99 cal./mole degree), and $\Delta H_v$ is the average apparent activation energy of the transfer medium over the temperature range $T-T_0$. $\Delta H$ can be obtained, as is known by those of ordinary skill in the art, by employing the viscosity-temperature relationship set forth at page 224 of the above Ferry text. The shifting of the curves along the time axis produces the master curve shown in FIG. 2 where the logarithm of the reduced modulus (log $G_{(t)R}$) is plotted against the logarithm of the reduced time [log $(t/a_T)$].

The time-temperature relationship as established by Equation I together with the master curve (FIG. 2) may be used to relate the process or contact time during which the transfer media undergoes mechanical deformation and subsequent adhesion to a temperature range over which the transfer media have a modulus within the range of $10^4$ to $10^8$ dynes/cm.$^2$. By selecting two of the three process parameters—modulus, transfer medium temperature, and transfer surface contact time—the third can be determined. To obtain 100% transfer conditions, the modulus value, whether selected or determined, should be within the specified range of from about $10^4$ to $10^8$ dynes/cm.$^2$. To illustrate the calculations, a modulus value of $2 \times 10^7$ dynes/cm.$^2$ and contact time of .2 seconds are selected. Next, the selected modulus value is located on the master curve which in turn locates a corresponding point M equal to 1.45 on the log $(t/a_t)$ axis of in FIG. 2. Thus: log $(t/a_T)$ = log $t$ - log $a_T$ = 1.45. Since log $t$ = log .2 = -.699, log $a_T$ is -2.149. Using this value for log $a_T$ in Equation I, and a $\Delta H$ value of 97 kcal. per mole degree (calculated for 40% Epon 1004—60% magnetite system) and a reference temperature $T_0$ of 348K. the temperature T is calculated to be 97° C. The process parameters are thus fixed—at a contact time of .2 seconds and a transfer medium temperature of 97° C., the transfer medium of 40% Epon 1004 and 60% magnetite (7 micron average particle size) will exhibit a modulus of $2 \times 10^7$ dynes/cm.$^2$ and accordingly will be transferred without splitting by silicone elastomer surfaces as herein defined. Other exemplary combinations of contact time and temperature to yield the modulus value of $2 \times 10^7$ dynes/cm.$^2$ are shown in Table II.

TABLE II [a]

| Contact time, seconds: | Temperature, °C. | Modulus, dynes/cm.$^2$ |
|---|---|---|
| 1 | 100 | $2 \times 10^7$ |
| .05 | 102 | $2 \times 10^7$ |
| .025 | 104 | $2 \times 10^7$ |

[a] The reference temperature is 348 K.

For a given temperature, the range of contact time over which the transfer media exhibits a modulus within the $10^4$ to $10^8$ dynes/cm.$^2$ range (generally in what is known as the rubbery region) depends on the material and on its molecular weight. For high molecular weight amorphous polymers the rubbery region is called the entanglement plateau and it may extend over several decades of reduced time. Some semi-crystalline materials, low molecular weight polymers, and other organic compounds may not exhibit a plateau and thus may be in the rubbery region for a relatively short period of reduced time. Similarly, for a given contact time, such transfer media exhibit rubbery response characteristics (generally a modulus of $10^4$ to $10^8$ dynes/cm.$^2$) over a relatively narrow temperature range.

In addition to FIGS. 1–2, there are also provided FIGS. 3–6 wherein:

FIG. 3 is a diagrammatic view in elevation of equipment for practicing one embodiment of the process of this invention;

FIG. 4 is an elevation view of an imaged printing plate which may be employed in the practice of this invention;

FIG. 5 is a diagrammatic view in elevation of equipment for practicing another embodiment of the process of this invention involving double offsetting; and FIG. 6 is a diagrammatic view in elevation of equipment for practicing still another embodiment of the process of this invention.

Referring to FIG. 3, a reservoir 1 containing a supply of thermoplastic transfer medium 3 in a dry, particulate state communicates with a coater roll 5 which picks up and delivers transfer medium 3 at interface 4 to a master roll 6 having a continuous, uniform layer 7 of a silicone elastomer bonded to the surface thereof. The deposited transfer medium is optionally carried past a purging roll 9 having a surface covering of polyvinylchloride (30 durometer). The polyvinylchloride has a greater force of adhesion for particulate transfer medium than the latter has for itself (cohesive force), and thus the polyvinylchloride can be used to purge the master surface of excess transfer medium, leaving at least a monolayer, however, since the adhesive force of the silicone elastomer is greater than the polyvinylchloride. Excess transfer medium picked up by purging roll 9 is transferred to contact roll 11 having a covering of a pile fabric for return to reservoir 1. The coating of transfer medium which passes purging roll 9 is then presented for transfer to receptor suface 13 at interface 12 in the nip region formed by master roll 6 and drive roll 14.

The transfer to the receptor surface involves considerations of transfer medium and receptor surface. If the transfer medium at the time of presentation to receptor surface 13 exists as a monolayer of hard, glassy particulate, the cohesive integrity thereof will exceed the retentive force exerted by the donor surface 7. Hence, splitting of the transfer medium between donor and receptor surfaces will not occur. Of course, the other consideration remains, i.e., whether any transfer will occur, and that depends on the relative forces of adhesion of the donor and receptor surfaces for the transfer medium. If the transfer medium is in dry particulate form and the receptor suface is a silicone elastomer which has a greater force of adhesion for the transfer medium than the donor surface in accordance with the above described principles, non-splitting transfer will occur. If the receptor surface is not a silicone elastomer, or some equivalent adhesive material, it is necessary to convert the transfer medium to a state such that it will develope the requisite adhesive force with the receptor surface. If this conversion is controlled in terms of transfer medium temperature and transfer surface contact time in accordance with the above discussion, not only transfer but substantially complete, non-splitting transfer will occur. If the transfer medium on the master surface exists as a multilayer of dry, particulate, to obtain 100% transfer to a receptor surface, whether silicone elastomer or not, it is necessary to control the conditions of transfer medium temperature and transfer surface contact time as above discussed to obtain the 100% transfer state.

Many embodiments of the process of this invention may be envisioned utilizing the principles illustrated by FIG. 3. Particularly preferred are embodiments wherein the continuous silicone elastomer surface of FIG. 3 is replaced by a pre-imaged silicone elastomer surfaced plate such as is illustrated in FIG. 4. Referring thereto, a metal sheet 15, preferably aluminum, is overlaid with a stable light-sensitive layer 19 which prior to development covers the entire surface of sheet 15. The stable light-sensitive layer 19 is of such a character that it is water insoluble and firmly bonded to the aluminum in its light-sensitive state. Firmly bonded to layer 19 is an intermediate, in situ formed anchoring layer 21, to which is firmly bonded the exterior silicone elastomer layer or coating 23. Layers 21 and 23 are transparent to light which is actinic with respect to layer 19. The plate is exposed to ultra-violet radiation through a positive transparency. During exposure, radiation passing through the transparent areas of the positive is projected through layers 23 and 21 to light-react an decompose the light-sensitive material in areas 17 so as to render the light-struck light-sensitive material 19 soluble and therefore removable by a developing solvent such as a mixture of alcohol and water, e.g., 2 parts isopropanol and 1 part water. Areas 25 remain shield from light exposure by the opaque areas of the positive. After the light-struck areas have been treated with a developing solution and physically rubbed away, the underlying aluminum surface in areas 17 is laid bare, leaving the insoluble layers in the areas 25. The surface layer 23 of area 25 is a silicon elastomer which will accept the thermoplastic transfer medium, and reject it in favor of a receptor surface in accordance with principles herein discussed. The light-struck areas in which the metal sheet 15 is exposed will generally not accept the transfer medium in the glassy state although small amounts sometimes are found to adhere. In such a case, the transfer medium, which adheres only lightly to such background areas, can be readily removed by contact with a purging roll of polyvinylchloride or other equivalent means.

Alternatively, the light-sensitive layer 19 may be a soluble diazo light-sensitive resin of such character that it becomes insolubilized and firmly bonded upon being light struck. Thus, after exposure to actinic light through a stencil or negative transparency, the plate can be developed by a suitable solvent which will remove the light-sensitive layer 19 and its overlayers in the non-light struck areas to lay bare the aluminum sheet 15 which preferably in this embodiment has a surface treatment of a silicate or its equivalent. The preparation and development of silicone elastomer surfaced printing plates suitable in the practice of this invention is described in application Ser. No. 607,728 of John L. Curtin, which application, incorporated herein by reference, is assigned to the assignee of this application. It should be noted that where negative plates are referred to in the above Curtin application, such plates are positive for purposes of this invention, and vice versa.

Referring to FIG. 5, a master surface of a preimaged silicone elastomer surfaced plate 28 such as is illustrated in FIG. 4 is firmly bonded to a core roll 6 which accepts transfer medium 3 from supply roll 5 in the imaged silicone elastomer areas 23. The transfer medium is then transferred at the nip to roll 29 having a metal core and a silicone elastomer coating 33 thereover, such elastomer being one which has an effective force of adhesion for the transfer medium 3 greater than the force of adhesion of the silicone elastomer master surface 23 for said medium. The transfer medium is then offset to roll 34 having an outer skin 35 of a silicone elastomer which exhibits a greater force of adhesion for the transfer medium 3 than silicone eastomer surface 33. Finally, the transfer medium is transferred with coincident fusion bonding to receptor surface 36 which makes nip contact with roll 34 by passage over drive roll 37.

In order to obtain non-splitting, 100% transfer between any of the opposing surfaces of FIG. 5, viz., 28–33, 33–35, the temperature of the transfer medium and the contact time of the surfaces involved in the particular transfer must be such that the transfer medium is in a non-splitting transfer state as above defined. It is preferred, however, that the transfer medium at the interface of rolls 5 and 28 (FIG. 5) not be subjected to temperatures which will destroy the free flowing particulate character of the transfer medium prior to its application to the master to form the image. For that reason, it is often desirable to delay subjecting the transfer medium to the temperatures necessary for 100% transfer until the transfer medium has been offset at least once from the master surface upon which the transfer medium was initially delineated. While careful localized heating at the nip between the first and second silicone elastomer surfaces could avoid subjecting the transfer medium being applied to the first silicone elastomer surface to temperatures which will convert it from the preferred particular state, in practice this is somewhat difficult to achieve. Thus, it has been found advantageous to defer subjecting the transfer medium to temperatures necessary to achieve 100% transfer to the second or subsequent transfer surfaces.

Other forms of silicone elastomer transfer surfaces than the silicone elastomer covered rolls may be employed in the practice of this invention. One particularly suitable form is illustrated in FIG. 6 wherein an applicator roll 39 of the type described in conjunction with FIG. 3 supplies a mutilayer of transfer medium to a pre-imaged silicone elastomer covered roll 41 such as is illustrated in FIG. 4. At least a monolayer of the transfer medium is then transferred to a second silicone elastomer surface in the form of a belt 43 which runs on a series of idler rolls 45a, 45b, 45c, and 45d. The particular transfer medium employed absorbs infra-red radiation. An infra-red lamp 47 having a shield 49 is located adjacent the underside of belt 43 bearing the infra-red absorbing transfer medium. The infra-red radiation penetrates the belt and is absorbed by the transfer medium. The residence time of the transfer medium under the infra-red lamp 47 is sufficient to convert the transfer medium to the rubbery or liquid region. A receptor surface feeding means 51 feeds the receptor surface 53 in sheet form around idler roll 45c so that receptor surface is immediately adjacent the surface of roll 45c and in contact with the transfer medium borne by belt 43. The receptor surface 53 and belt 43 with the interposed transfer medium then progress around idler roll 45d. At some point at or between the idler rolls 45c and 45d, the modulus of the transfer medium is lowered, preferably to the liquid flow state (below $10^4$ dynes/cm.$^2$), by means of infra-red lamp 47 to establish a bond between the receptor surface and the transfer medium. In the time of contact between conversion of the transfer medium and removal of the receptor surface from contact with belt 43, the transfer medium cools to the rubbery flow region wherein it achieves a modulus within the $10^4$ to $10^8$ dynes/cm.$^2$ range. The receptor surface is removed from contact with belt 43 after the belt and receptor pass idler roll 45a by a takeup means not shown. So long as the modulus of the transfer medium at the time of separation does not fall below the $10^4$ dynes/cm.$^2$ lower modulus limit, 100% transfer to the receptor surface will be obtained, although exceeding the upper modulus limit of $10^8$ dynes/cm.$^2$ after the initial bonding will not reverse the transfer or cause splitting.

Heating of the transfer medium on the transfer surfaces may be accomplished in a vairety of ways. In the case of a transfer surface in the form of a covering on a roller, heating means inside the roller bearing the transfer medium may perform the task. Another typical arrangement is the use of an external heat source generally located in proximity to the nip region of the donor and receptor transfer surfaces. Still another arrangement is the use of internal heating means in the roller which bears the receptor surface. As the transfer medium on the donor surface is conducted by the receptor surface, the transfer medium is simultaneously heated. Other suitable arrangements for heating the transfer medium will be apparent to those skilled in the subject art. For any thermoplastic transfer medium, once the contact time for the transfer surfaces is chosen, the temperature of the thermoplastic transfer medium to provide the 100% transfer state can be determined according to the previously described technique. The particular heating means can then be regulated to provide the heat necessary to achieve the desired transfer medium temperature.

The pattern which the transfer medium initially assumes on the first silicone elastomer surface may or may not be an imaged pattern; in the latter instance the operation could best be termed a coating operation whereas in the former, a printing or duplicating operation is involved. An image pattern may be initially developed on the elastomer surface by the use of an imaged plate structure having transfer medium receptive silicone elastomer areas bordered by non-receptive areas, a particularly suitable structure being that illustrated in FIG. 4. Imaging in this manner may be termed direct imaging. Alternatively, the elastomer surface may be a continuous silicone elastomer surface which is indirectly imaged by the transferral to it of thermoplastic transfer medium from a previously imaged source.

One such indirect imaging technique involves an electrographic process in which a differentially electronically conductive pattern corresponding to the graphic intelligence to be reproduced is created on an insulating layer electrode (field electrode), such as by exposure of a dark adapted photoconductive sheet to a light image in the absence of extraneous light or by the use of an electrically insulating image on a conductive substrate. While the differentially conductive pattern is present, the entire field electrode surface is uniformly contacted with a transfer medium, for example, by means of an electronically conductive roller or cylinder having adhered to the outside surface thereof a layer of electronically conductive transfer medium (developer powder). Concurrently with the application of the transfer medium to the field electrode surface, an electrical field is created by applying a direct current electrical potential between the field electrode containing the differentially conductive pattern and the applicator of the transfer medium. An electronically conductive path is created between the differentially conductive pattern of the field electrode and the applicator, such as through the circuit made by an electronically conductive powder transfer medium. Separation of the transfer medium applicator from the field electrode surface at the end of the development stage must be made while the electrical field is still maintained. The transfer medium selectively deposits on the electrode surface in a pattern-wise manner. This electrographic imaging process is more fully described in French Pat. 1,456,993. The transfer medium is removed from the field electrode by contact with a silicone elastomer surface. The electrode can be reimaged as long as the differential conducting pattern remains.

A suitable thermoplastic transfer medium for the electrographic process above described has the following composition in percentages by weight whereon the average particle size is 7 microns:

| | Percent |
|---|---|
| Epon 1004 [1] | 44 |
| Magnetite | 52 |
| Carbon black | 4 |

[1] Tradename for a polystyrene resin available from the Shell Chemical Corp.

This powder is made by spray drying this formulation from a solvent such as chloroform. The particles are spherical and have a pressed powder conductivity of about $10^{-9}$ mhos$^{-1}$ cm.$^{-1}$. Another suitable developer powder for the above described electrographic process consists of 65% polystyrene and 35% carbon black.

Another indirect imaging system involves the use of an electrostatically sensitized photoconductive plate such as a zinc oxide coated plate or selenium plate which has been imaged by subjection to actinic light which discharges the photoconductive surface in the light struck areas. When an electroscopic thermoplastic transfer medium is cascaded over this photoconductive surface, the transfer medium is attracted to the non-light struck charged areas awaiting transfer to a silicone elastomer surface. Transfer medium for use in this process are well known to those in the art, an exemplary one being the following described in U.S. Pat. No. 2,857,271:

| | Percent |
|---|---|
| Piccolastic 4358 [1] | 87 |
| Carbon black | 5.2 |
| Nigrosine SB (C.I. 50415) | 5.2 |
| Iosol (Solvent Black 13) | 2.6 |

[1] Tradename for a polystyrene resin available from the Pennsylvania Industrial Chemical Corp.

Another example of electrostatic delineation of an image area for use as an indirect imaging source for the process of this invention is the development on a tape of photoelectric images by electrostatic means as described in U.S. Pat. No. 3,076,393, incorporated herein by reference. In a similar manner, magnetic delineation as used in ferromagnetic processes or in magnetic tape processes described in U.S. Pat. No. 2,985,135 can be used for the initial image delineation which will then be used to transfer powder images to the elastomer surface. Stencils can also be used to delineate an image onto a silicone elastomer surface and thus serve as an input for the process of this invention. Suitable thermoplastic transfer medium formulations for pre-imaged silicone elastomer surfaces as illustrated in FIG. 4 are the following in which percentages are by weight: (1) 50% magnetite (black iron oxide), 50% "Piccolastic E–100" (trade name for a polystyrene resin available from Pennsylvania Industrial Chemical Corp.); (2) 60% magnetite, 40% "Piccolastic D–125" (trade name for a polystyrene available from the Pennsylvania Industrial Chemical Corp.); (3) 50% nickel zinc ferrite, 50% "Piccolastic D–125"; (4) 12% benzidine yellow (C.I. 21090), 88% "Epon 1002" (trade name for an epoxy resin available from the Shell Chemical Corp.); (5) 12% Watchung Red (C.I. 15865), 88% "Epon 1002"; and (6) 12% Monastral Blue (C.I. Pigment Blue 15, Ref. No. 74160) 88% "Epon 1002."

The thermoplastic transfer medium can be prepared by several techniques; for instance, by spray drying an organic solution or emulsion of the developer material or by an extrusion-grinding process. Particles can be conveniently classified into the desired size range. The particle size of the transfer medium generally ranges from 0.5 and 50 microns, preferably between about 2 and about 15 microns for most applications. However, specific applications may demand lower or higher size ranges. For example, very high resolution systems will demand particles of 1 micron and less. For several reasons, spherical particles are preferred. The powders preferably have a flowability angle of repose ranging from about 80 to 125 degrees. Flowability is measured by feeding a thin stream of powder to the upper flat surface of a circular pedestal from a vibrating funnel, thereby creating a conical deposit of powder on the pedestal. The angle of repose is defined by the angle between the side of the cone and the pedestal at 25° C.

To better illustrate the invention, the following non-limiting examples are provided wherein all parts and percentages are by weight unless other wise stated.

EXAMPLE 1

A 1⅛ in. diameter magnetic applicator roll rotating counterclockwise at a surface speed of approximately .6 inch/second applies a .020 in. thick layer of "Epon–1004"—magnetite (1:1 by weight) in hard, glassy particulate form to a pre-imaged silicone elastomer surface such as is illustrated in FIG. 4. The pre-imaged surface is mounted on a 4 inch diameter, 10 inch wide plate cylinder rotating clockwise at a surface speed of 6 inches/second. The pre-imaged master surface consists of an aluminum foil/polyethylene laminate with silicone elastomer ("Dow #780") image areas approximately .00025 in. thick developed on the aluminum surface. The temperature of the master surface is maintained below 60° C.

Making nip contact with the master surface is a 4 inch diameter, 10 inch wide first offset roll having a surface covering of 0.040 inch thick "GE102" silicone elastomer. The master surface and the first offset roll, rotating counter clockwise at a surface speed equal to the master surface (6 inches/second), provide a minimum nip interference of about 0.005 in., thereby exerting a total nip pressure of about 30 pounds. At this temperature and the contact time determined by the surface speed and the nip length between the transfer rolls, the transfer medium remains in substantially the hard, glassy state and accordingly essentially only a monolayer is transferred to the first offset roll.

A 4 inch diameter, 10 inch wide second offset roll covered with a 0.040 in. thick surface of "RTV–631A" silicone elastomer surface makes nip contact with the first offset roll, the nip interference and pressure being essentially the same as for the master surface—first offset roll nip. The second offset roll, rotating in a clockwise direction at 6 inches/second, is directly driven, and this force is transferred due to the respective nip contacts, to the first offset roll and master surface to provide the necessary driving force. The second offset roll is internally heated to 130° C. whereas the first offset roll is maintained at about 80° C. to provide a nip temperature between the first and second offset rolls of about 105° C. At such temperature and for the transfer surface contact time, the transfer medium achieves a modulus within the range of $10^4$ to $10^8$ dynes/cm.$^2$ during its residency between the first and second offset rolls and accordingly complete transfer to the latter occurs. It should be noted that since only a monolayer of glassy particulate transfer medium is received by the first offset roll, the cohesive integrity of the transfer medium already exceeded the adhesive force exerted thereon by the first offset roll and thus heating is not essential to effect complete transfer to the second offset roll. However, in this example, the final receptor surface is a non-silicone elastomer, specifically paper, and to effect transfer to it, it is necessary to convert the transfer medium to a state wherein the adhesive force between the receptor surface and transfer medium exceeds the adhesive force exerted by the donor surface on the transfer medium. For non-silicone elastomers, such as paper, this involves heating the transfer medium to convert from the glassy particulate state to the rubbery state or the liquid state. Heating, at the interface between the first and second transfer surfaces, while not essential, does insure complete transfer to the latter in the event that more than a monolayer of transfer medium was transferred to the first offset surface.

Making surface contact with the second offset roll is a receptor surface in the form of a continuous sheet of bond paper which is driven between the nip formed by the second offset roll and a drive roll (such as roll 14, FIG. 3) rotating in a counterclockwise direction at the same speed as the second offset roll. The paper is supplied at room temperature. With the second offset roll at 130° C., the nip temperature achieved is measured as 105° C., conversion of the transfer medium to a modulus within the $10^4$ to $10^8$ dynes/cm.$^2$ range is effected, and non-splitting transfer to the paper with coincident fusion bonding is accomplished. Equivalent results are obtained in the process of this example when the paper receptor surface is replaced with plastic, aluminum, stainless steel, ceramic, and glass receptor surfaces.

EXAMPLES 2–4

Employing the equipment and materials described in Example 1, the same results are achieved utilizing the conditions noted in Table II below.

TABLE II

| | Surface speed,[a] in./sec. | First offset roll temp., °C. | Second offset roll temp., °C. |
|---|---|---|---|
| Example: | | | |
| 2 | 9 | 85 | 135 |
| 3 | 15 | 100–105 | 145–150 |
| 4 | 34 | 105–110 | 175–180 |

[a] This is the speed of the master surface, first and second offset surfaces, and receptor surface.

Examples 2–4 illustrate the fact that with interdependency of decreasing transfer surface contact time, the temperature of the transfer surfaces should be increased to achieve the 100% transfer state.

EXAMPLE 5

This example illustrates a single offset printing process involving development of a pre-imaged silicone elastomer surface by essentially a monolayer of dry, particulate thermoplastic transfer medium and transfer of the developed image to a silicone elastomer surfaced offset roll and finally to a receptor surface of conventional bond paper.

A 1⅛ inch diameter magnetic applicator roll rotating counter-clockwise at a surface speed of approximately .6 inch/second provides a transfer medium layer (1:1 by weight Epon 1002-magnetite) 0.020 in. thick to a printing plate consisting of a pre-imaged master surface mounted on a 2¾ inch diameter plate cylinder. The applicator roll is spaced about 0.015 in. from a printing plate. The pre-imaged master surface consists of an aluminum foil/polyethylene laminate with silicone elastomer (Dow #780) image areas approximately .00025 inch thick developed on the aluminum surface. The printing plate rotates clockwise at a surface speed of 6 inches/second.

Downstream of the applicator roll-printing plate nip region is a purging roll (1 in. diameter) having a surface covering of .25 in. thick polyvinylchloride having a durometer of 30. The adhesion of the powder transfer medium to the polyvinylchloride ink is greater than that of the aluminum background for transfer medium or of transfer medium for itself (cohesive force of the powder ink) but less than the attractive force of the silicone elastomer for the powder ink, thus removing all background contamination as well as all powder in excess of a monolayer on the silicone elastomer image areas. The nip presure between the purging roll and the printing plate may be as light as possible, the pressure being no more than sufficient to insure contact along the entire length of the nip. In contact with the purging roll is a brush roll (1¼ in. outside diameter) having a surface of soft fibers ¼ in. in length extending therefrom to pick up transfer medium from the purging roll and return it to the supply.

Making nip contact with the master surface is an offset roll having a surface covering of 0.060 inch thick "GE780" silicone elastomer to which the monolayer of particulate transfer medium is transferred substantially completely. The master surface and the offset roll, rotating counter clockwise at a surface speed of 6 inches/second, provide a minimum surface interference of about 0.005 in. thereby exerting a nip pressure of about 30 lbs. over a 10 inch wide transfer surface.

Making surface contact with the offset roll is a receptor surface in the form of a continuous sheet of bond paper driven between the nip formed by the offset roll and a drive roll rotating clockwise at the same speed as the offset roll. The drive roll is heated to a temperature sufficient to provide a nip temperature of 105° C. which in this example converts the transfer medium to the 100% transfer state.

EXAMPLE 6

This example illustrates a printing process involving development of a pre-imaged silicone elastomer by a multilayer of dry particulate thermoplastic transfer medium and transfer of the developed image to a silicone elastomer surface of conventional bond paper utilizing equipment illustrated in FIG. 6.

The belt is made by coating a 0.005 inch thick polysulfone film with a 0.010 inch layer of a silicone elastomer available from Dow Corning Co. under the tradename RTV-732. The transfer media ("Epon 1004"/magnetite, 2:3 by weight), has an average particle size of 7 microns. The pre-imaged silicone elastomer master surface is that described in Example 1. The surface speed of the belt and the master surface is 20 inches/second and a uniform belt tension of 90 pounds is maintained over the 9 inch wide belt. The developed image on the plate makes nip contact with the silicone elastomer belt and the transfer medium is adhesively removed to the belt surface which is then brought into pressure contact with a receptor paper around an idler roll such as roll 45c, FIG. 6. The infrared absorbing transfer media is heated by a standard lamp used in thermographic copying machines. A 350 volt potential is impressed on the lamp at a total power consumption of 1800 watts. The diameter of the idler roll is 1½ inch and the temperature of the roll is approximately 95° C. Under these conditions, the transfer medium is transferred substantially completely to the receptor surface to provide 8½ x 11 inch size copies at the rate of approximately 100 per minute.

EXAMPLE 7

This example compares the ability of silicone elastomers to transfer thermoplastic transfer media with that of various other polymeric surfaces.

The non-silicone elastomer test surfaces are prepared by knife-coating a solution of the polymer at a wet thickness of 10 mils onto a 3 mil thick polyester film. The samples are permitted to dry for 72 hours at room temperature and atmospheric pressure and then adhesively bonded to a 3 in. diameter aluminum roll.

In the case of the silicone elastomers, the test surface was prepared by knife-coating onto a 3 mil thick polyester film a 30 mil thick coating of the uncured polymer (of paste consistency as commercially available) to which has been added one of the many conventional curing agents. The sample is then air cured for 72 hours followed by 30 minutes at 105° C. to insure complete curing. The polyester film backed silicone elastomer surface is then adhesively bonded to an aluminum roll of the same dimension as is used for the non-silicone elastomer test surfaces.

The aluminum roll bearing the test surface is heated to 110° C. and then brought into contact with a sheet of bond paper traveling between the nip formed by the test roll and a backup roll having a thin surface coating of "Teflon," (trade name for poly(tetrafluoroethylene) resin available from E. I. du Pont & Co.). The backup roll is also internally heated to a temperature of 110° C. The paper receptor surface travels through the nip at a surface speed of 1 inch/second. To the test surface is applied a transfer medium consisting of 40% "Epon 1004" and 60% magnetite. The quality of the transfer to the receptor surface is shown in Table III.

TABLE III

| Elastomer | Release value,[a] grams/ inch | Transfer performance |
|---|---|---|
| Polyisobutylene [b] | 700.0 | Image splits. |
| Polyvinyl alcohol [c] | 225–400 | Do. |
| Chloroprene [d] | >700.0 | Do. |
| Poly(tetrafluoroethylene) [e] | 235–240 | Do. |
| "Dow 589" | 5 | 100% transfer. |
| "GE RTV 11" | 5 | Do. |
| "Dow 780" | 20 | Do. |
| "Dow 583" | ~0 | Do. |

[a] TAPPI Routine Control Test 283 is used to calculate release values the only modification being that the curing step of the adhesive bond at an elevated temperature and pressure is omitted.
[b] "Vistanen L-100," Enjay Chemical Co. trade name for a polyisobutylene resin, M.W. 81000–99000.
[c] "Elvanol 71-24," E.I. du Pont & Co. trade name for a polyvinyl alcohol resin.
[d] "Neoprene AF," E.I. du Pont & Co. trade name for a chloroprene resin.
[e] "Teflon," Type C, FEP, E.I. du Pont & Co. trade name for a poly (tetrafluoroethylene) resin.

EXAMPLE 8

This example illustrates indirect imaging of a silicone elastomer surface by an electrographic process in which a differentially electronically conductive pattern corresponding to the graphic intelligence to be reproduced is created on an insulating layer electrode (field electrode) by exposure of a dark adapted photoconductive sheet to a light image in the absence of extraneous light or by the use of an electrically insulating image on a conductive substrate.

A dispersion of 33 parts photoconductive zinc oxide powder, 5 parts titanium dioxide, 16 parts of 30% by weight of "Pliolite S–7," trade name for a styrene-butadiene resin available from Goodyear Rubber Co., in toluene, 3 parts polystyrene, 40 parts toluene and $4 \times 10^{-4}$ grams of Phosphine R (C.I. 46055) per gram of zinc oxide as a 2% by weight alcoholic solution is ballmilled for 12 hours. The dispersion is coated (3.3 grams/ft.$^2$ (dry)) on 45 pound paper which has been subbed with a 0.2 gram/ft.$^2$ layer of cellulose acetate. The layer is dried and allowed to dark adapt for a period of 12 hours. The procedure of dark adapting can be accelerated by heating the construction at an elevated temperature of 70–100° C. This sheet is exposed to a projected positive image with 20 foot-candles falling on the photosensitive surface for one second.

The exposed field electrode is clamped onto the plate roll. The conductive powder applicator roll as described in Example 1 is used to apply a conductive developer powder. The sheet is passed between the applicator roller and a metal plate roll at the rate of 5 inches per second. A potential of +1500 volts is applied to the conductive applicator roller and the plate roller is grounded. The linear speed of the applicator roller is 0.5 in./sec.

The developer powder, having an average particle size of about 7 microns, has the following formulation:

|  | Percent |
|---|---|
| Epon 1004 | 44 |
| Magnetite | 52 |
| Carbon black | 4 |

The powder is made by spray drying this formulation from a solvent. The particles are spherical and have a pressed powder conductivity of about $10^{-9}$ omhs$^{-1}$om$^{-1}$. The powder image develops on the field electrode corresponding to the non-light struck areas. The image is adhesively removed from the field electrode by contact with a continuous silicone elastomer (Dow–780) offset roll heated to 105° C. A bond paper receptor surface, traveling between the nip of the offset roll and a backup roll also heated to 105° C., receives the image from the offset roll without splitting. Equivalent results are obtained when the bond paper receptor surface is replaced with a polyester film (3 mil thick). Multiple copies can be made as long as the conductivity differential exists in the field electrode.

The photoconductive field electrode can be replaced with a plate in which an insulating resin image is on a metal backing. For example, an imaged lithographic plate ("S–P" plate, trade name for a lithographic plate available from the 3M Company) has an insulating resin image on an aluminum base. The imaged plate is placed on the apparatus and 500 copies are made at the same temperature and speed setting as above.

The process of this invention provides a high speed, high quality method of coating, printing, or duplicating. The process is not limited to special receptor surfaces or special treatments thereof. Excellent results are obtained with conventional papers. The direct fusion bond which results from transfer to receptor surfaces eliminates the need for separate fixing techniques. Since the process conditions can be selected to obtain non-splitting transfer, registration of the transfer surfaces is unnecessary.

What is claimed is:

1. A process for transferring thermoplastic transfer medium comprising:
    (1) applying a non-solvent based thermoplastic transfer medium to a first silicone elastomer surface;
    (2) contacting said thermoplastic transfer medium bearing first silicone elastomer surface with a receptor surface for a period of time during which
        (a) said thermoplastic transfer medium is in a state wherein at least the portion of said thermoplastic transfer medium in direct contact with said receptor surface has a cohesive integrity thereof exceeding the force of adhesion exerted thereon by said first silicone elastomer surface, and
        (b) the force of adhesion between at least said portion of said thermoplastic transfer medium and said receptor surface exceeds the force of adhesion between said portion of said thermoplastic transfer medium and said first silicone elastomer surface, and
    (3) separating said first silicone elastomer surface from said receptor surface whereby at least said portion of said thermoplastic transfer medium transfers substantially completely to said receptor surface.

2. The process of claim 1 wherein said receptor surface is another silicone elastomer surface having a greater force of adhesion for said thermoplastic transfer medium than said first silicone elastomer surface.

3. The process of claim 1 wherein said receptor surface is paper.

4. The process of claim 1 wherein said receptor surface is a film of polymeric material.

5. A process comprising the steps of:
    (1) applying non-solvent based thermoplastic transfer medium in dry, particulate form to a first silicone elastomer surface said transfer medium assuming a fixed pattern on said first silicone elastomer surface;
    (2) optionally offsetting at least once at least a monolayer of said thermoplastic transfer medium in said fixed pattern from said first silicone elastomer surface to another silicone elastomer surface, each successive offsetting silicone elastomer surface having a force of adhesion for said thermoplastic transfer medium which exceeds the force of adhesion of the silicone elastomer surface from which the thermoplastic transfer medium is received;
    (3) contacting for a period of time the last silicone elastomer surface in the series bearing the thermoplastic transfer medium with a final receptor surface, during which period of contact the thermoplastic transfer medium is subjected to a temperature at which said thermoplastic transfer medium assumes a modulus within the range of about $10^4$ to about $10^8$ dynes/cm.$^2$; and
    (4) removing said final receptor surface from contact with said last silicone elastomer surface while said termoplastic transfer medium is within said modulus range whereby said thermoplastic transfer medium in said fixed pattern is transferred substantially completely to said final receptor surface.

6. The process of claim 5 wherein said first silicone elastomer surface is a continuous surface.

7. The process of claim 5 wherein the first silicone elastomer surface is selectively arranged in the form of an image.

8. The process of claim 5 wherein there is one silicone elastomer offset surface.

9. The process of claim 5 wherein there are a plurality of silicone elastomer offset surfaces.

10. A process comprising the steps of:
    (1) developing an image delineated by non-solvent based thermoplastic transfer medium in dry, particulate form on a silicone elastomer surface;
    (2) offsetting said image at least once to a silicone elastomer surface, each successive transfer silicone elastomer offset surface having a force of adhesion for the thermoplastic transfer medium exceeding the force of adhesion for the thermoplastic transfer medium of the silicone elastomer surface from which the thermoplastic transfer medium is to be received;
    (3) contacting for a period of time the last offset silicone elastomer offset surface bearing the thermoplastic transfer medium with a final receptor surface during which period of time the thermoplastic transfer medium assumes a modulus within the range of about $10^4$ to about $10^8$ dynes/cm.$^2$; and
    (4) removing said final receptor surface from contact with said last receptor surface while said transfer medium is within said modulus range whereby said thermoplastic transfer medium is transferred substantially completely with coincident fusion bonding to said final receptor surface.

11. The process of claim 10 wherein said first mentioned silicone elastomer surface is selectively arranged in the form of an image.

12. The process of claim 10 wherein said receptor surface is paper.

13. A process comprising:
(1) applying non-solvent based thermoplastic transfer medium in dry, particulate form to a master surface having image areas of a silicone elastomer, and background areas of a nonsilicon elastomer;
(2) purging said non-silicone elastomer background areas of said master surface of any thermoplastic transfer medium thereon;
(3) offsetting at least a monolayer of said thermoplastic transfer medium from said image areas at least once to a silicone elastomer surface, each successive transfer silicone elastomer offset surface having a force of adhesion for the thermoplastic transfer medium exceeding the force of adhesion for the thermoplastic transfer medium of the silicone elastomer surface from which the thermoplastic transfer medium is to be received;
(4) contacting for a period of time the last offset silicone elastomer offset surface bearing the thermoplastic transfer medium with a final receptor surface during which period of time the thermoplastic transfer medium assumes a modulus within the range of about $10^4$ to about $10^8$ dynes/cm.$^2$; and
(5) removing said final receptor surface from contact with said last receptor surface while said transfer medium is within said modulus range whereby said thermoplastic transfer medium is transferred substantially completely with coincident fusion bonding to said final receptor surface.

References Cited

UNITED STATES PATENTS

| | | | |
|---|---|---|---|
| 3,309,254 | 3/1967 | Rowe | 156—240 |
| 3,330,712 | 7/1967 | Rowe | 156—240 |
| 3,436,293 | 4/1969 | Newman | 156—240 |

LELAND A. SEBASTIAN, Primary Examiner

U.S. Cl. X.R.

101—426; 156—247; 161—406, 413